United States Patent [19]
Martin

[11] Patent Number: 6,003,036
[45] Date of Patent: Dec. 14, 1999

[54] INTERVAL-PARTITIONING METHOD FOR MULTIDIMENSIONAL DATA

[76] Inventor: Michael W. Martin, 107 Huntsmoor La., Cary, N.C. 27513-4732

[21] Appl. No.: 09/022,936

[22] Filed: Feb. 12, 1998

[51] Int. Cl.$^6$ .................................................. G06F 17/30
[52] U.S. Cl. .................................. 707/102; 707/3; 707/5; 707/100; 707/101; 707/501
[58] Field of Search .................................. 707/8, 100, 3, 707/201, 5, 9, 501, 101, 102

[56] References Cited

U.S. PATENT DOCUMENTS

| | | | |
|---|---|---|---|
| 5,226,109 | 7/1993 | Dawson et al. | 345/420 |
| 5,495,539 | 2/1996 | Sieverding | 382/276 |
| 5,497,486 | 3/1996 | Stolfo et al. | 707/7 |
| 5,546,499 | 8/1996 | Lynch et al. | 704/240 |
| 5,551,027 | 8/1996 | Choy | 707/201 |
| 5,701,467 | 12/1997 | Freeston | 707/100 |
| 5,710,915 | 1/1998 | McElhiney | 707/3 |
| 5,787,422 | 7/1998 | Tukey et al. | 707/5 |
| 5,864,857 | 1/1999 | Ohata et al. | 707/100 |
| 5,870,768 | 2/1999 | Hekmatpour | 707/501 |
| 5,878,424 | 3/1999 | Dooling et al. | 707/102 |
| 5,886,700 | 3/1999 | Di Pippo et al. | 345/355 |

OTHER PUBLICATIONS

"Alhorithms for Multidmensional Partitioning of Static Files", Rotem & Selev, Nov. 1988 IEEE Transactions on Software Engineering, pp. 1700–1710.

"Robust and Efficient Spatial Data Structure", ACTA Informatica, Jul. 1992, pp. 335–373.

Polo et al., "Multi–dimensional partitioning for massively parallel database machines", Proceeding, Euromicro Workshop on Parallel and Distributed processing, 1995, Jan. 25–27, 1995, pp. 244–251, ISBN: 0–8186–7031–2.

*Primary Examiner*—Wayne Amsbury
*Assistant Examiner*—Shahid Alam

[57] ABSTRACT

A data structure that uses one or more keys which are members of a multidimensional composite key to partition sparse data (FIG. 2A, FIG. 2B) into a hypercube like structure (FIG. 1). Only the data structure produced by the method in this invention is actually better than a hypercube since all involved keys can have true symmetric access as opposed to just the keys that have the highest sort order significance. Equivalent query efficiency could only be otherwise obtained through storing multiple copies of the sparse data sorted on different permutations of the member keys of the multidimensional composite key (FIG. 2C). The data structure has two major components: the partitioned data with or without the boundary keys and the non-dense index necessarily containing the boundary keys (FIG. 3). This data structure and partitioning method can be used to partition multidimensional data across physical hardware storage devices and parallel computer architectures (FIG. 4) to produce variable grained data partitions that can be queried, loaded, or updated in parallel and simultaneous multidimensional index selectivity. And finally, as noted above, this same partitioning method can be used in a nested fashion or in combination with other data structures to provide good performance for the batch maintenance of volatile data and special performance advantages for true time-series data.

6 Claims, 5 Drawing Sheets

39

| Time | Product | Zip Code | Sales |
|---|---|---|---|
| 1 | 1 | 1 | 11900 |
| 1 | 1 | 2 | 9871 |
| 1 | 3 | 1 | 4522 |
| 1 | 3 | 2 | 6789 |
| 1 | 3 | 4 | 7845 |
| 1 | 5 | 4 | 7291 |
| 2 | 1 | 2 | 6180 |
| 2 | 1 | 4 | 37481 |
| 2 | 1 | 5 | 31255 |
| 2 | 2 | 1 | 2532 |
| 2 | 2 | 2 | 73452 |
| 2 | 2 | 3 | 2143 |

Fig.2A

| Zip code | Product | Time | Sales |
|---|---|---|---|

Fig.2B

| Time | Zip Code | Product | Sales |
|---|---|---|---|
| Time | Product | Zip Code | Sales |
| Product | Zip Code | Time | Sales |
| Product | Time | Zip Code | Sales |
| Zip Code | Time | Product | Sales |
| Zip Code | Product | Time | Sales |

Fig. 2C

INTERVAL-PARTITIONING METHOD FOR MULTIDIMENSIONAL DATA

BACKGROUND

1. Field of Invention

This invention relates to OLAP (OnLine Analytical Processing) and Data Warehouse applications, specifically to data structures and algorithms providing better performance and efficiency for these applications by providing a very effective storage and retrieval mechanism for multidimensional data.

2. Description of Prior Art

Data Warehouse and OLAP applications have highlighted the need for a fast way to store and retrieve multidimensional data. To date other attempted solutions have not met this need.

To illustrate the prior art and how it differs from this invention consider sales data dimensioned by zip code, day, and product. Sales data is stored for 50,000 zip codes, 1000 days, and 10,000 products. The sparsity factor is 1% on average so that of the 500,000,000,000 records that would result from all possible combinations of zip code, product, and day only about 5,000,000,000 records actually have associated data and need to be stored in the fact table. In addition to the keys, the record format contains a field for sales so that the record format is represented by FIG. 2A and FIG. 2B below.

Even with a very efficient table and index design, the space required to store only the records with actual data is at least 5,000,000,000×(2 bytes+2 bytes+2 bytes+4 bytes+4 bytes) or approximately 65.19 gigabytes.

Couple this with the fact that users of the data may want to query the data by any combination of zip code, product, and/or day. They may want the total sales dollars for a given product and day. Or they may want to know the average sales volume per month in a certain zip code for the past 12 months. Any combination of key fields along with any possible values of those key fields may be chosen. The data truly must be multidimensional with efficient and symmetric query access paths.

There is not a good way to store and retrieve this data with today's database technology. Consider the alternatives:

1) Store the data in a heap table (as is commonly done in relational databases) and use some combination of one or more indexes.

The type of index does not matter. They could be traditional B-trees, more sophisticated star-join indexes, bit maps, and/or hashing routines. No matter how efficient the index is, all table pages that contain data satisfying the query must be accessed at least once in order to produce a query result set. If the data for a zip code, for example, is spread thinly over many table pages as opposed to clustered or grouped together in fewer pages, query performance is degraded by the additional I/O that is necessary to retrieve the extra table pages.

In addition, as many developers and DBAs know from experience, the problem can be much more severe than this. A combination of poor optimizer access plans and the use of dense indexes with low data cardinality often causes more harm than good. The optimizer plan can access a given table page many times during the life of the query in lieu of extracting all rows satisfying the query during a single pass of the table page. This might be true in the business example above if the data in the table were sorted by product and all the data for a group of days for all products were queried. The problem literally can cause a query to run for days. Ironically, via indexes, the query can end up requiring much more time than a single full table scan would have required in the first place.

The use of indexes that are managed as heaps in combination with tables that are managed as heaps makes it difficult to combine indexed access with parallel query processing. Since records that have equal key field values can randomly be stored in the heap, it is difficult to partition the table and index data into component pairs that can be run independently.

As if the other problems were not enough, the solution also wastes too much space. Data must be stored in indexes as well as tables. Albeit, some indexes are more frugal in their use of space than others. Any duplication of data, however, is magnified by the fact that tables of this type can range into several terabytes in size.

While this solution is excellent for OLTP applications, it is clearly less than optimal for OLAP applications.

2) Take advantage of modem hardware technology and store the data in a non-indexed table and allow parallel processors and high capacity I/O subsystems to do the work.

Obviously, this is too inefficient. No matter what degree of parallelism is used, queries in the example above should not have to access 65 gigabytes of data to retrieve a 10 kilobyte result set.

If 10's or 100's of users are running these type queries on one or more tables, database server resources can be quickly depleted.

This solution causes queries to run too long and uses too many resources. The data should be organized in such a way that data accessed together is stored together. Then queries can perform I/O only for the table pages that are needed to satisfy the query.

3) Store the data in a cube-like data structure as depicted in FIG. 1 below. Many niche OLAP products use a similar structure.

If the data were not sparse, this would work pretty well. It would provide efficient and fast access to the data and, the query access would be fairly symmetrical. But, with the sparse sales data in the example above, approximately 6.5 terabytes of data would be required to store a cube large enough to house the data. This would be 100 times larger and 100 times slower in terms of I/O to access than the original data. In addition, a more subtle problem emerges. If the order in which the data is stored in the cube is by zip code then product and finally time, access may not be so symmetric. Access for the outer-most key fields is fine but, restricting the data by choosing a small subset of days from the possible choice of 1000 days may not yield improvement over a full table scan in query performance. If the data is stored in a database with 16 kilobyte table pages, then to access all the sales data for one day, all data in the entire fact table would have to be scanned because an occurrence of that particular day would exist on nearly every table page. This is in contrast to the fact that the data for one day should constitute about 1/1000th of the size of the complete fact table.

This solution is not realistic for sparsely populated OLAP fact tables. Attempts have been made to pack sparse fact tables into smaller cubes but, this further limits the symmetric or multidimensional capabilities of the cube.

4) Use clustering and/or partitioning to "divide and conquer" the data.

This method works pretty well as long as the data is clustered or partitioned in the same way that it is accessed.

But, query performance is not symmetric with this solution. If the data is accessed in a way that is different, performance can be as bad or even worse than storing the data randomly or in a heap like structure. This is true since clustering or partitioning the data by one set of keys, distributes or disperses data with the same key values that are not part of the cluster or partition or are not in the prefix of the clustering or partitioning key.

Multiple partitions and clusters can be constructed for the same data. This improves query performance since it provides the clustering or partitioning advantage for a wider range of queries. However, each new cluster or partition requires an additional copy of the complete table. Of course this is very expensive in terms of disk space. And in order to make this approach completely general so that queries involving any combinations of key fields from the composite key of the table can take advantage of the technique, an exponential number of clusters or partitions with respect to the number of fields in the key must be built. To be completely effective, each of these clusters must replicate the data.

For generalized, symmetric OLAP access, this method is less than ideal.

5) Use a special approach just for OLAP or GIS/spatial data that combines the best part of the previously mentioned methods.

The most successful method of this type to date has been the grid file.

The grid file actually works very well in terms of query efficiency since it clusters data based on all key fields in the composite key of an OLAP table. Therefore, no matter which combination of key fields and values within those key fields are used to qualify a query, the grid can be used to narrow the number of table pages that must be accessed in order to retrieve the query set. In addition, grid file indexes or scales are usually designed small enough so that they can be stored entirely in RAM memory to further aid query speed.

Never the less, grid files are not without problems. The way in which data is divided leaves large holes in the storage space thus wasting space and slowing queries down by requiring more I/O.

To compound this, grid files also usually store the actual table pages in a heap like fashion. This makes the combination of grid files with parallel processing more difficult to achieve.

This method also leaves much to be desired but, there is a better way.

OBJECTS AND ADVANTAGES

This invention has been specifically designed for OLAP multidimensional tables. As a result, it solves the problems of the five major approaches mentioned above and provides one very effective method for storing OLAP data.

It does not have the problems associated with the first approach above. It stores the table and indexes all in one data structure. The space requirements for this data structure are no larger than the requirements to store only the table in conventional approaches. No space is needed for indexes. In fact, table pages are packed 100 percent full so that this complete data structure (data and indexes) requires much less space than most heap tables by themselves. It also does not have the problem of dual I/O (index and table). And, the data is organized according to the algorithm or method contained in this invention. This organization is similar to that of clustering or partitioning except that is truly symmetric and multidimensional. Amazingly, this data structure still allows efficient incremental updates. This is especially true for time-series data where incremental updates for this data structure are very efficient.

This data structure is easy to be divided into parallel components, as in the second approach above, while avoiding the problems of depending only of parallel technology. It is not necessary to query each combination in the Cartesian Product space of all values selected from each dimension in order to perform a star-join. These individual dimension value lists can be divided up to match the organization of this data structure. Each of these subcomponents of the query can be queried, grouped, and aggregated independently. This data structure allows the query to divided into a granularity that matches the number of logical disks that the data is stored across. RAID technology such as RAID-5 actually improves the efficiency of the data structure by making it more symmetric. With RAID technology, queries using any combination of key field values, execute as if all data needed by the query is stored contiguously. The data structure also issues all I/O at the beginning of the query and in disk page order so that thrashing of the disk head is prevented. But most important of all, the data structure allows the query to select only the table pages containing data needed by the query at the same time that it takes full advantage of parallel technology at a maximum level of granularity.

Data is stored in a similar manner as in FIG. 1 below. This invention has all the advantages of a hypercube even when the data has very high levels of sparsity. For high levels of sparsity the symmetric and multidimensional qualities of this data structure are not diminished yet, the data is compacted to occupy a minimum amount of space. Moreover, this invention is actually better than a hypercube since it preserves multidimensionality no matter what order the key fields data are stored. Still further, the degree of multidimensionality and selectivity of key fields can actually be adjusted to suit individual application needs.

This data structure provides the ultimate data locality sought after with the fourth approach of clustering and partitioning. This data structure provides performance virtually as good as if the data were sorted and partitioned by every possible permutation of key fields in the table. But, instead of requiring the data to be replicated a large number of times, this invention does not require any space for indexes. Using this data structure in the business example above is virtually the equivalent of replicating and sorting the data by all the key permutations in FIG. 2C below. Of course this data structure requires no replication.

Finally, this invention is more efficient than the grid file data structure in the fifth approach. No space is wasted when the data is divided by grid scales. All table pages are always 100 percent full. In addition, no additional space is need for indexes. And, as mentioned before, it is well suited toward parallel queries.

This invention truly has the ability to revolutionize the data warehouse and OLAP industry. It is simple to implement and maintain yet provides very powerful features designed just for this type of data.

BRIEF DESCRIPTION OF THE DRAWINGS

FIG. 2A and FIG. 2B represent data that might be stored in a multidimensional data structure.

FIG. 2C represents a minimum set of sorted copies or permutations of the data that would be required to efficiently query on all possible multidimensional key combinations if the sample data in FIG. 2A and FIG. 2B were stored in B-tree type data structures.

DESCRIPTION—MAIN EMBODIMENT

Figure 1:
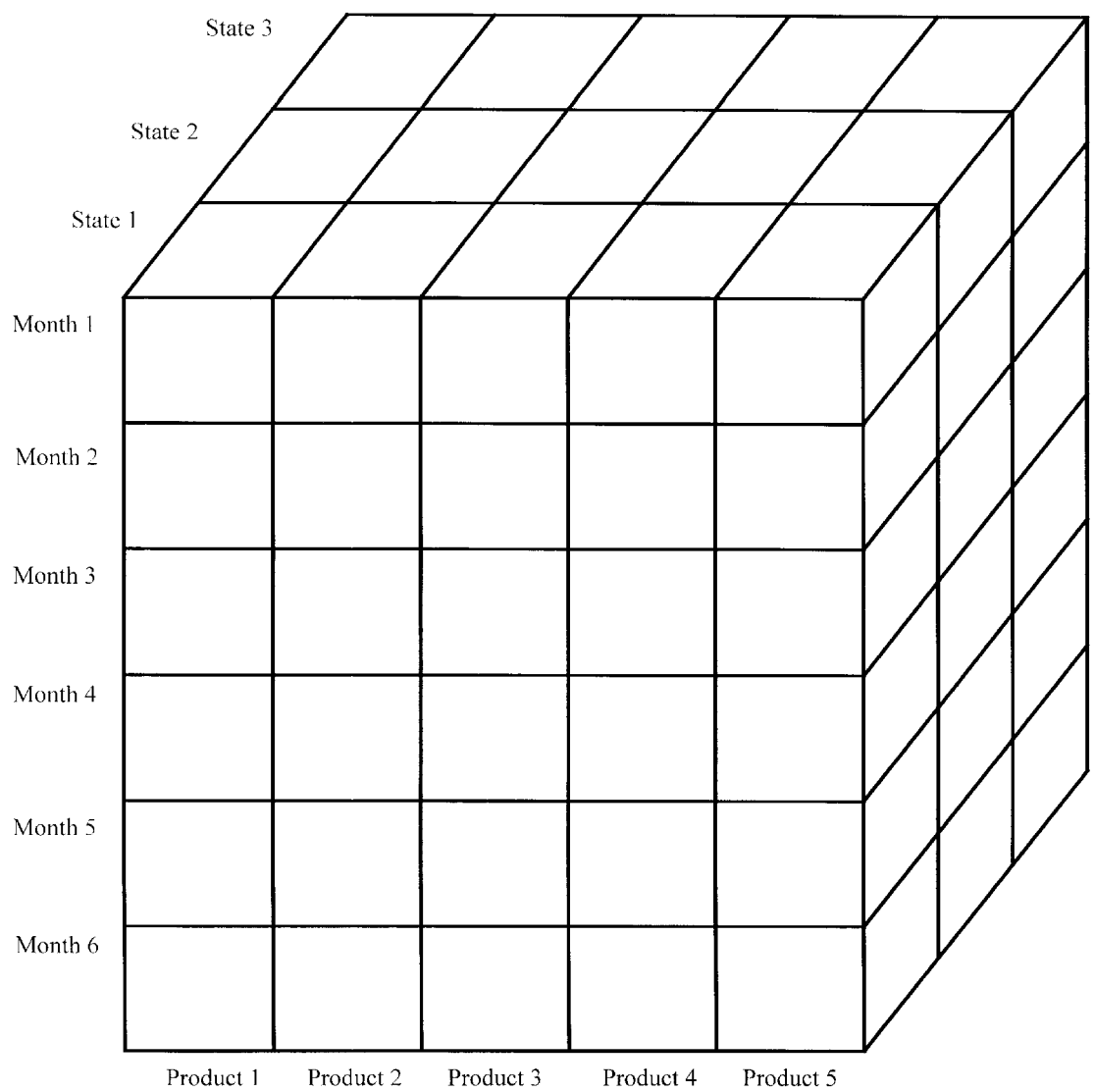
FIG. 1 is a type of data structure contains place holders for records for every possible combination of keys in a multi-dimensional file.

The method contained in this invention partitions multidimensional data to provide efficient query access for Data Warehouse and OLAP (OnLine Analytical Processing) applications. OLAP data can be conceptually represented by a multidimensional or hypercube structure as depicted in FIG. 1. OLAP data can only be stored in such a hypercube structure if none or only a very small portion of the data is missing or in other words if the sparsity factor is low. If data with a high sparsity factor is stored in a hypercube, a large amount of space is wasted. In short, the Hypergrid allows sparse data to be stored in a multidimensional type data structure such as depicted in FIG. 1. This is done, as the title suggests, by sorting and partitioning the data into intervals of values. Instead of sorting and organizing the data completely by one dimension, it is sorted and partitioned according to a controlled number of intervals for each dimension. For example, if the data to be organized contains 1000 distinct product values and 5000 distinct time values, it would not be sorted by product into 1000 different groups or alternatively by time into 5000 different groups. Instead, it might be sorted and partitioned into 50 equal sized intervals of product values and, within those intervals, 250 intervals of time values. In this way, each dimension assists in the organization of the data and can thereby be used in the query process to eliminate partitions or segments of the data which do not need to be searched for a particular query. This is true no matter which combination of dimensions and selection criteria are used to query the data. The structure and components of a Hypergrid are defined with the aid of the example below.

A few assumptions are needed to begin the example. A fact table is a set of data based on a composite or compound key. The composite key is usually, but not necessarily, made up of integers. An example is depicted in FIG. 2A. Each component key or field in the composite key of the fact table corresponds to a single field primary key in a dimension table. The relationship between each component key in a fact table and a primary key in a dimension is commonly known as a foreign key relationship in databases.

The example in the previous paragraph only depicts a few records. But, consider the same type data expanded to include 50 states and 50,000 products. Assume data is collected on a daily basis as opposed to a monthly basis. Further, assume that about 3 years or 1000 days worth of data is maintained. With low sparsity, this fact table could contain as many as 2.5 billion records. A low sparsity factor for a fact table means that all or most possible combinations of composite key values are present in the fact table. Assume the data is 90% sparse or empty (contains only 10% of the possible composite key values) so that there are approximately 250 million records. According to FIG. 2B this data has a three field composite key and one metric or non-key field for a total of four fields. Each of these fields can be represented by a 4 byte integer so that the total number of bytes per record is 16.

With this information, the number of magnetic disk resources utilized can be calculated. This fact table contains 16×250,000,000 bytes or about 3.72 gigabytes of data. If this data is to be stored on a disk drive unit with track sized partition units of 50 kilobytes, 78,125 disk tracks would be required to store the data. In this case disk tracks are chosen to be the unit partition. Disk sectors or pages of other various sizes could also have been chosen as the unit partitions in lieu of the 50 kilobyte disk tracks. In general, with current direct access, I/O (input/output) rotating storage technology, the size of a unit partition should fall inclusively between a disk sector and disk track so that data in a unit partition can be accessed with exactly one physical I/O operation without moving the read/write head. Since the index associated with this data structure is non-dense and an order of magnitude smaller than the data, it should be possible in most cases to retain the index portion of a Hypergrid in RAM (Random Access Memory) for maximum efficiency and speed. In addition, any record in the Hypergrid should be accessible with only one I/O. If multiple records in the query criteria are on one unit partition, that unit partition should be visited no more than one time during the entire query operation.

The Hypergrid partitions the data using all fields in the composite key that have been selected as member fields. This can be any subset of the composite fields. Only fields that are member fields of the composite key can be used by the Hypergrid to selectively eliminate unit partitions that do not need to be searched. This is a result of the way the data is structured or partitioned in the Hypergrid. This partitioning can be done in several ways. The number of partitions can be divided evenly among the member fields. In the case of this example, there would be approximately 42 partitions per field. Note that more than 50 partitions for the state key should not be used since there are only 50 states and more than 50 partitions would not provide additional benefits. Alternatively, the fact table could be analyzed in full or estimated to determine the relative number of distinct data values or relative cardinality for each member field in the composite key compared to the other member key fields in the composite key. In this case there are likely to be about 50 times more products than days and about 20 times more days than states. Therefore, the product field would be assigned about 1000 partitions, the time field would be assigned 20 partitions, and the state field would only be assigned 4 partitions. These partitions could also be assigned using fixed, relative, minimum or maximum weights. For example, the product field could be constrained to have at least twice the number of partitions as the time field. As noted above, each field or component key should always be constrained to have no more partitions than there are distinct values for that key which occur in the data. In summary, the number of partitions for each field could be determined using any combination of analytical and explicit assignments to best fit the given application or situation.

The partitions are used to structure the data in the fact table. These partitions are used to divide the data across the disk tracks, or more generally unit partitions, that are required for storage of the data. In the case cited above, 78,125 would be required. For simplicity, assume the first method is chosen and that each key partitions the data 42 ways.

Figure 3:
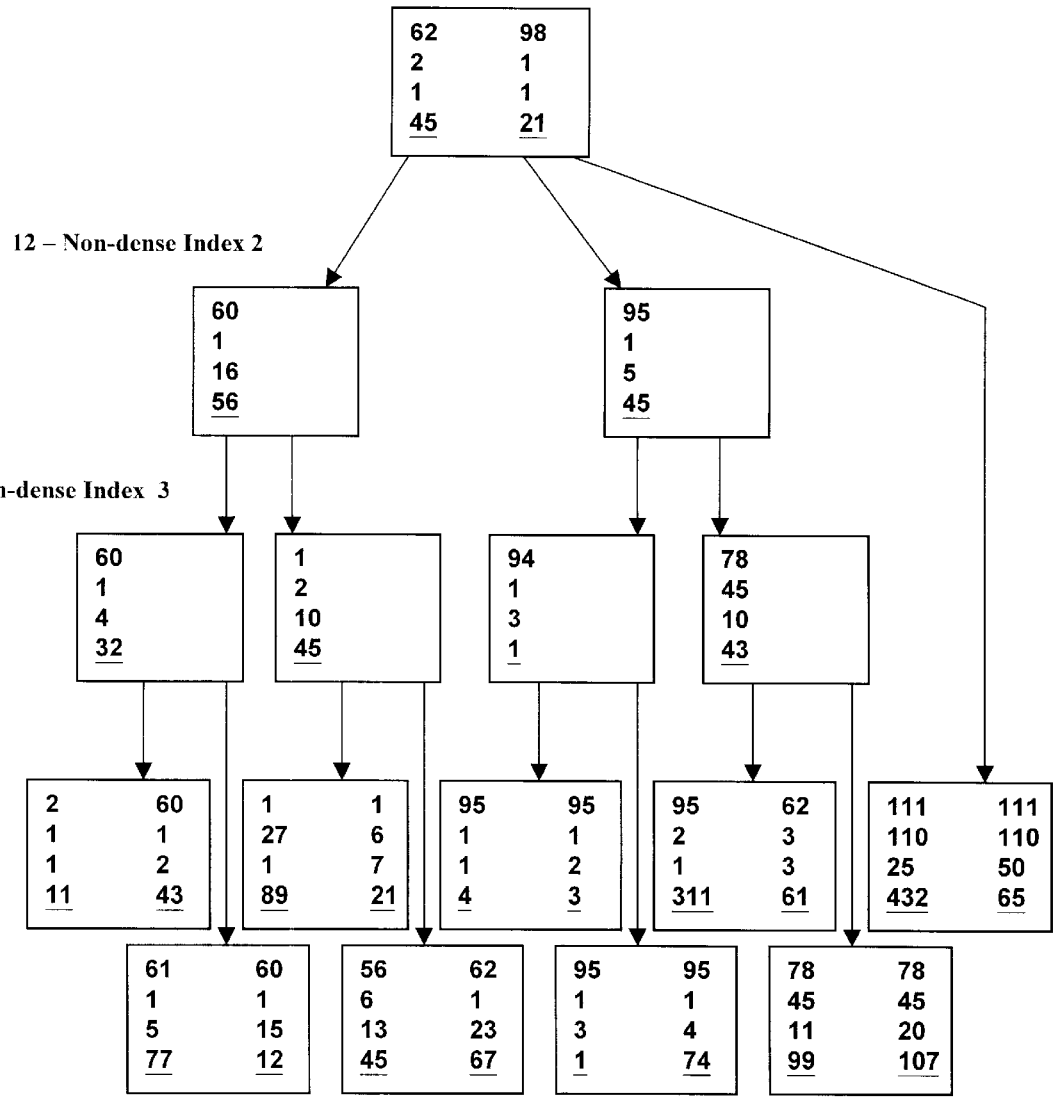
FIG. 3 is the internal data structure of a typical embodiment of the Hypergrid.

A Hypergrid is structured as a hierarchy of partitions as depicted in FIG. 3. In FIG. 3 each non-dense index represents a dimesion.

The order of the member fields chosen from the composite key determines the order of partitioning in the Hypergrid. If the order of the fields in the above example is state, product, and time, then the data is first divided into 42 partitions according to state. In order to create the first 42 data partitions, the data can be sorted according to state, product, and time since this is the field order of the composite key. It is possible and probable that the data will not change state values exactly on the partition boundaries. In other words, all the North Carolina data will not be in one partition while all the South Carolina is in another partition. Both the North Carolina and South Carolina data would likely overlap two or more state partitions. Consequently, other key values are needed to divide the data exactly at the partition boundaries. This is also done according to the ordering of member fields in the composite key. The first partition boundary in the 42 state partition boundaries might be state=2, product=2, and time=322 (Note that only the key values are used in the table. A lookup in the dimension would be required to obtain the state or product name.). Thus each of these 42 partitions has values for each component field of the composite key. It is also worth noting that all keys fields are used to determine exact partition boundaries even if only a proper subset of the key fields are selected as member fields. The key fields corresponding to the last record in each partition are promoted to the non-dense index associated with this level in the partition hierarchy. Pointers are not needed if fixed length integers or byte fields are used for key values and the non-dense indexes for each level of the partition hierarchy are stored contiguously so that addresses can be implied or calculated. Now within each state partition there will be 42 product partitions. Again, these probably will not be divided exactly by product key. Consequently, in these 42 product sub-partitions the entire composite key is once again used. In this case the order of the key is nearly the same as the parent partition but the leading key is moved to the last position in the composite key so that the order is now product, time, and, state. This process recurs in all levels of the partition hierarchy from the least granular partitions down through the unit partitions or in this case disk tracks. The partitions associated with the lowest level key component also need not contain pointers to unit partitions if can be implied or calculated as would be the case when the unit partitions are stored contiguously on a particular I/O device.

For each partition level in the hierarchy, there must be a non-dense index. It is important to note here that a B-tree or a B+tree could be used. This coupled with only a very small amount of free space on data pages or partitions (usually less than 1% depending on record sizes relative to partition sizes) results in the fact that very little overhead storage space is needed for the Hypergrid method. The indexes are non-dense because the underlying data is sorted according to the index and only one index entry is needed per data partition. This is surprising since a non-dense index can usually only be applied to one set of fields and one ordering of the data and therefore can only be one dimensional. A Hypergrid allows non-dense B-trees for all dimensions. indexes Compression could also be used.

Figure 4A:
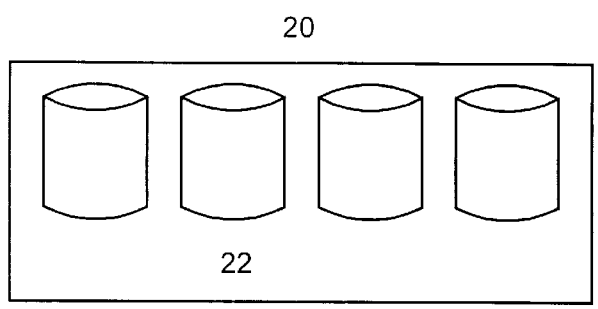
FIG. 4A, FIG. 4B, FIG. 4C, FIG. 4D and FIG. 4E represent some typical embodiments of the Hypergrid on varies computer hardware configurations.
Figure 4B:
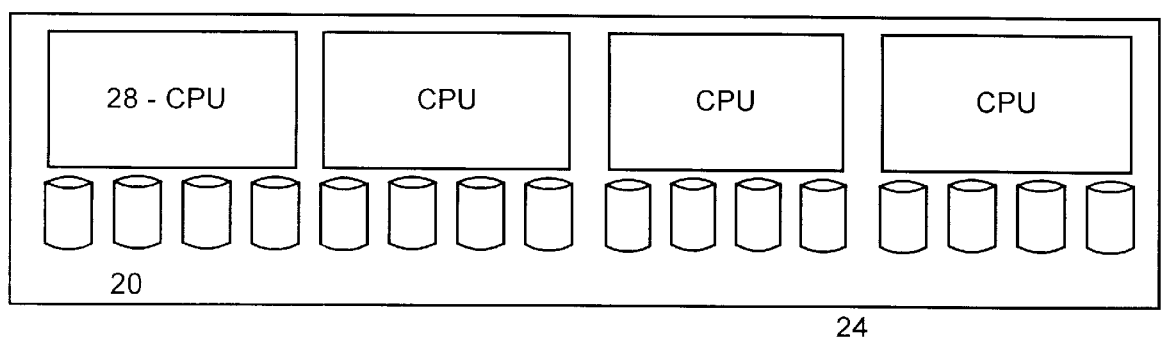
Figure 4C:
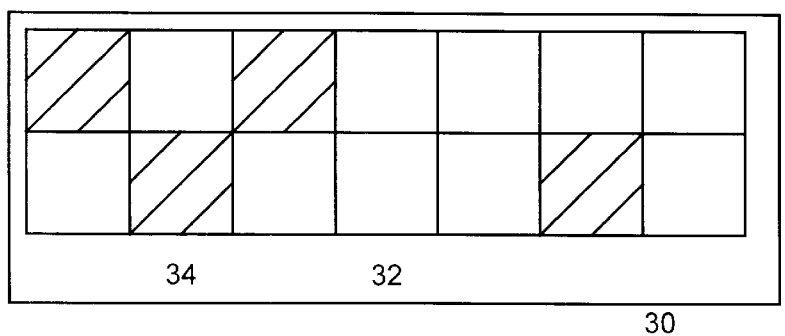
Figure 4D:
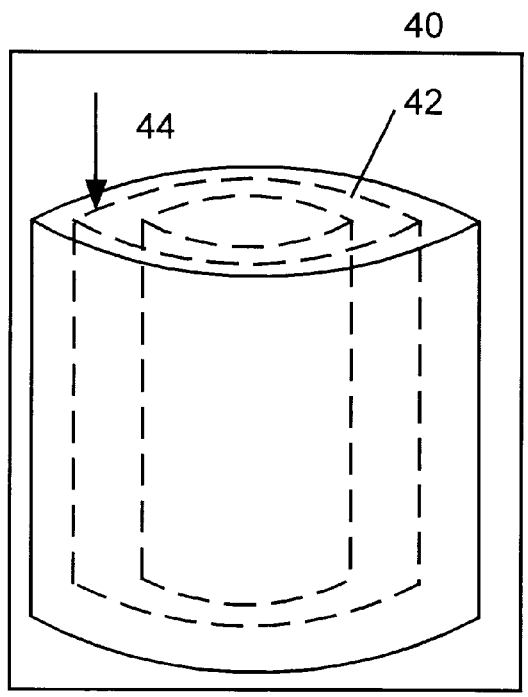
Figure 4E:
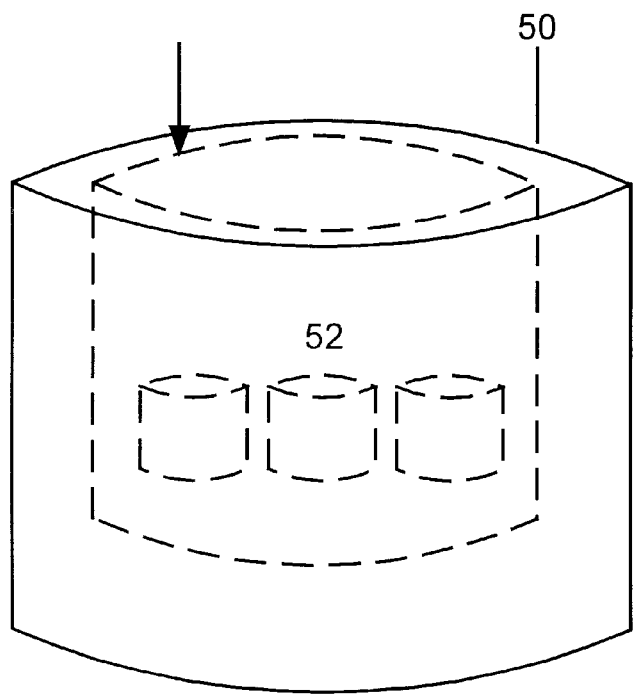

In the above example a disk track is used to partition the data. The partitioning can occur across all types and levels of peripheral I/O storage devices. In addition, the partitioning can be nested. As suggested before, the level or type of device used to partition the data is referred to as the partitioning unit. The data could be partitioned across disks as shown in FIG. 4A, complete non-shared parallel computer systems as shown in FIG. 4B, disk sectors or pages and sub-pages as shown in FIG. 4C, or disk tracks and/or cylinders as shown in FIG. 4D. The data can be partitioned across RAID (Redundant Array of Independent Disks) I/O devices as depicted in FIG. 4E. In this case, each group of RAID devices is treated as a single disk device. Instead of disk sectors, tracks, and cylinders, the devices usually have virtual sectors, tracks, and cylinders which work in a similar manner as standard disk devices only with faster transfer times. The data partitions could also be nested. The data could be partitioned across non-shared computer systems and then within these computer system partitions, data could be partitioned across disks or other hardware I/O devices. Each disk or I/O device could be further partitioned into disk tracks or pages. The data could be still further partitioned into disk sub-pages with each disk page or track. The Hypergrid has an important advantage in this area. Since the partitions are filled to nearly 100% of capacity and non-dense indexes with record promotion are used, no space is wasted. This is true, as well, when the partitions are nested. Standard transaction B-trees and Grid files which are partially to completely full would waste much space if they were nested. For each additional level of nesting used the space utilization would continue to decline for these other data structures.

When multiple disks devices or RAID units, as the case may be, are used to store Hypergrid data, the data does not have to completely fill each device. This is known as thinly spreading the data. Thus, each disk could be filled to 25% capacity. Of course, the advantage to doing this is more parallel I/O devices working on the same amount of data and therefore resulting in faster query (and load) times.

The partitions for a given key level in the hierarchy do not usually contain the same number of partitions. Consider the example above. Each level has 42 partitions and there are a total of 78,125 unit partitions. 42 raised to the third power should equal the number of unit partitions or 78,125. But 42 raised to a power of 3 equals 74,088. The number 42 was obtained by evaluating the third root (since there are three supporting component or member key fields) of 78,125 which approximately equals 42.7 and truncating everything to the right of the decimal point. 43 could not be used since 43 raised to the third power is 79,507 which is too large. Thus 42 partitions per level must be the starting point and additional partitions are added where needed.

To match the number of partitions in each level with the total number of unit partitions, partitions are added in selected sub-trees of the overall partition hierarchy tree. The process of adding partitions begins at the top of the partition hierarchy. Provided that the number of unit partitions produced by the partition hierarchy does not exceed the number of unit partitions required by the data, the number of partitions in the top level is increased by one. Note that this adds a complete sub-tree. The process is repeated for the next lower level. This process is repeated until the bottom level of the partition hierarchy is reached or until no level can be completely increased by one without exceeding the number of total unit partitions. Note that all partition levels can not be increased by one because if this were the case, the initial starting numbers could have been larger. At all levels other than the top level, all groups of sub-partitions, according to partitions in the parent level, are increased by one in order to increase the overall level by one. This is equivalent to increasing the number of partitions in the top level by one. The process is continued at each level other than the bottom level until another level can not be fully increased by one partition in all groups of sub-partitions without exceeding the number of unit partitions required by the data. Once this point is reached the lowest level groups of sub-partitions can be individually increased by one partition each until the number of partitions in the hierarchy is exactly equal to the number of unit partitions required by the data. The number of partitions at each level and the number of partitions in the bottom level with an extra partition are also stored in data structure for use in queries. (The storage of the number of partitions is a requirement when addresses are implied in the absence of pointers.)

Records do not align perfectly to partitions in most cases. If partition units are 50 kilobytes each, and records are 28 bytes each, 1828.57 records can be placed on each partition. For performance reasons, however, records should not be split across pages, especially if an I/O is required to obtain each page. Therefore, 1828 records must be placed on each page.

The problem is worsened by variable length records and fields. For variable length records, a null record equal to the maximum record length must be left vacant on each unit partition. In the case of partitions internal to unit partitions which can be accessed in one physical I/O, this is not a problem since sub-pages do not have to be of uniform size. This also does not present a problem for nesting and multiple levels of partitions since the extra space need only be left vacant one time per physical I/O unit or unit partition. This wasted space could be eliminated altogether but, records may require an extra I/O to be accessed. Finally, the fact that one record per partition is promoted to the indexes, compensates for the vacant space since it allows space equal to one more record per page.

Each partition in a Hypergrid should be visited exactly once for all records that would reside in that portion of the data during executions of queries. Consequently, for all records in that portion of the data, exactly one I/O in total is required. When more records are accessed per partition, the query becomes more efficient in terms of I/O since an individual unit partition should never be accessed more than once in the life of a query. Partitions not involved in the query are not accessed at all. Nested partitions, to be discussed in more detail below, can be used to provide simultaneous multiple data partition granularities for the same data at no additional cost. Therefore, once a partition is moved into memory, a processor need not scan the entire partition to locate a particular record. This allows unit partitions to be much larger as in the case of a disk track. As a result B-tree index sizes are much smaller and can easily be placed in RAM memory. In addition, data can be partitioned across complete computers, disk devices, and disk tracks all at once through nesting.

Operation—Main Embodiment
Construction of the Hypergrid

The steps detailed below correspond to the data flow diagram that follows them.

Step 1) in constructing a Hypergrid for a fact table is to determine what composite key to use in the Hypergrid for the fact table. The key will be some permutation of the composite key in the fact table. The fields selected in this permutation are known as member fields. For example, if the composite key involves fields a, b, and c, then the following are possible permutations or member fields sets:

| a, b, c | a, b | b, a, c | c | a, c | c, b |
| --- | --- | --- | --- | --- | --- |

Note that all the fields in the composite key do not necessarily have to be used and the fields can be used in any order.

Step 2) is to determine the number of partitions for each field that will be required. This step is slightly more complex.

For the permutation of key fields chosen in step 1), the number of partitions for each field must be chosen. The data can be analyzed first. This will determine the key cardinality or the average number of distinct values that exists in the data for each field with the context of other field values. If the permutation to be used is a,b,c, then analysis provides information about the average number of field values in the data for the context of each distinct value of b and c. It also provides similar information about the average number of values for b and c. Optionally, the analysis of key cardinality can be performed as part of the sorting and partitioning of the data. After analysis, or as a first step, the partitioning method must be selected. This may involve any combination of the following methods but is not limited to these methods:

1) equal partitioning: nth root of the number of unit partitions required by the data where n is the number of member fields in the permutation that has been selected. The resulting number of partitions for each key is truncated to whole numbers.

2) relative constraints: each field in the permutation is assigned a relative constraint factor. For example 4a, 1b, 3c might be assigned. The relative constraints are determined from the analysis phase. One of the constraint factors is usually set to 1. The others are assigned to be multiples. A product of the constraints is calculated. In this case the product would be 12. The number of unit partitions is divided by the product. This is the adjusted number of unit partitions. Then the root of the adjusted unit partitions is calculated as in the first method. The result of this calculation is the adjusted root. The adjusted root is truncated to a whole number. The number of partitions for each field is the product of the adjusted root and each respective constraint factor.

3) fixed constraints: one or more fields in the permutation are assigned a fixed constraint. Assuming that there are sufficient unit partitions (the product of the fixed constraints can not be larger than the number of unit partitions), each field that has been assigned a fixed constraint is assigned that number of partitions. The number of unit partitions divided by the product of the fixed constraints is used to calculate the number of partitions for the remaining fields. All results are truncated to whole numbers.

4) limits: fields can be assigned limits. First the number of unit partitions for each field is tentatively calculated. The assigned limits are then applied. The total number of unit partitions is divided by the constrained fields to determine the adjusted unit partitions and the remaining field partitions are determined from the adjusted unit partitions. The root of the adjusted unit partitions is also truncated to a whole number.

When any of the above methods are used, numbers of partitions are calculated. These calculations are rarely limited to whole numbers. As mentioned before, results of the calculations are truncated to whole numbers. Therefore, to fully utilize all partitions, the following technique is employed:

1) If possible, and the product of the partitions does not exactly equal the total number of unit partitions, add 1 to the number of partitions in the first field in the composite key for the fact table. All constraints, including the total number of partitions, can not be violated. Most important of all, the product of the partitions in each of the fields must be equal to or less than the total number of unit partitions required to store the data from the fact table.

2) Continue with each field until the last field in the composite key or bottom level in the hierarchy has been increased by one partition or until the product of partitions equals the total unit partitions. Proceed as in the first part of the technique with one exception. The partitions are structured in hierarchical fashion as described in the above section on structure. In all but the first field or top level in the hierarchy, a partition must be added to each sub-partition group with respect to its parent level to increase the overall partitions for the level by one.

3) If the product of partitions is not equal to the total number of unit partitions at this point, add one to each sub-partition group in the bottom most level of the partition hierarchy until the number of partitions in the hierarchy is exactly equal to the total number of unit partitions. Partitions should be added from left to right if implied addressing is to be maintained.

In most cases, some free space must be left in each partition because record sizes do not always align perfectly with partition sizes. As a result, free space up to size of the maximum length of a record must be left vacant. This must be considered when calculating the number of unit partitions required to store a fact table. If the records are fixed length, then the sum of available space on a unit partition minus any partition overhead such as a field containing the number of records per partition is divided by the record size and truncated to a whole number. This determines the number of records that can be packed into each unit partition. This number can be divided into the total number of records in the fact table and rounded up to the next highest integer to determine the number of unit partitions that are required. For variable length records, the unit partition size minus the maximum length of a variable length record in addition to any other overhead must remain vacant on each partition. The total size of the fact table in bytes is divided by this adjusted unit partition size to determine how many unit partitions will be required to store the data. This vacant area is used as an overflow on each unit partition in the case of variable length records.

Steps 3) and 4) are to partition the data by the first field in the composite key.

This can be done with at least a couple of different methods. One method is to sort the data by the composite key with the first field as the lead field in the key. For large data, modern computer technology allows parallel sorting techniques to be used to reduce the time required to sort the data. Once the data is sorted in this fashion, it can easily be partitioned according to the number of partitions in the first field. Alternatively, the data can be partitioned without completely be sorted. Instead, each partition area is sorted separately and an efficient partitioning algorithm is used to find the boundary key values for each partition that would be in place if the data were completely sorted. This can also be performed in parallel. The data in each partition area is sorted according to the composite key with the leading key as the first field in the key. In searching for the first, second, third, or nth partition boundary value, the boundary value is obtained independently for each partition. These independent partitions values are sorted and assembled into a list of potential boundary values. (There should be n squared key boundaries in the list where n is the number of partitions for the first member field or highest level partition.) Once this list is known, the boundary value for the overall list is contained in the closed and discrete interval which is covered by the these keys. It is simply a matter of narrowing down the list. To narrow it down, each key is checked to determine how it partitions all the data. This can be done by summing up the individual number of records on each side of the key for all the other parition areas. If the key partitions the data too far to the left according to sort order, move to the right in the list or vice versa. If the correct key boundary can not be found in the list, then the boundary key is between the last two keys in the list that were checked. In this case, keys values from all the partition area which are between the last two key values in the list are checked. This can also be done in an efficient manner with a binary search since the partition areas are sorted. Notice as more checking is performed, the range of possible values becomes more narrow.

Assuming that the fact table contains only distinct key values, there will be exactly one key somewhere in the data that partitions the data correctly. Once all partitions are determined in this manner, data is moved to the correct partition. Again, all this can be done in parallel since each partition boundary can be determined independently.

Both the sorting and parallel partitioning algorithms can be used to determine if there are duplicate keys in the fact table. With sorting, of course, duplicate key values will be relocated to adjacent positions. With the parallel partitioning technique, duplicate keys are placed in the same unit partitions where they can be easily identified by sorting the data within each unit partition which would be done anyway for performance reasons.

Partitions often are not the same size. Some of the partitions may contain exactly one additional unit partition. The partitions with extra unit partitions should all be moved to one side or the other (usually the left) so that Hypergrids not using pointers can easily calculate or imply addresses within the data structure.

Steps 5) and 6) are to repeat the process in Steps 3) and 4) for each sub-partition on the next lower level. Of course, now the sorting or parallel partitioning is limited to the scope of individual sub-partitions. The process is the same except that the second field in the composite is used as the leading field for the partition keys. All fields in the partition key will still need to be used. The second field is brought to the front by removing the first field and concatenating it on the back of the composite key.

Step 7) is to repeat Steps 5) and 6) until the data is partitioned by all the composite key member fields.

Step 8) is to build a non-dense index for all composite key fields. One non-dense index is built for each member field or level in the partition hierarchy. Each unit partition boundary is in exactly one B-tree. No unit partition boundary is in more than one B-tree. The top level non-dense index contains all of the most coarse grained partitions. The next level contains the sub-partitions of the first level partitions. Each of the partition level boundaries is contained in one non-dense index.

Step 1)

Assign key positions within the composite key (e.g., designate state, product, and time as the key positions for the composite key in the previous example).

Step 2)

Determine the number of partitions per key (e.g., 10 for state, 2 for product, and 4 for time). This might involve an analysis data step to determine the number of partitions per key.

Step 3)

Order all data to be stored using this concatenated key by ascending or descending order with the key positions specified in Step 1). This step is not needed for parallel partitioning.

Step 4)

Divide the data into the number of partitions specified for the first key according to Steps 1) and 2).

Step 5)

Sort the data within each first key partition according to the remaining keys (e.g., if the data is partitioned by state, sort the data by product and time within each state).

Step 6)

Divide the data into the number of partitions specified for the second key as was done in Step 4).

Step 7)

Repeat Steps 5) and 6) for all remaining key fields in the composite key.

Step 8)

Build the B-trees associated with each set of keys associated with the composite key. There will be one B-tree index per component key.

Querying the Hypergrid

The steps detailed below correspond to the data flow diagram that follows them.

Step 1) is to produce a set of selection keys from user query criterion. This can be in the form of keys that are to be included from each dimension or key field, keys that are excluded from each dimension or key field, or no selection criteria for a dimension or key field which translates into all the keys for the dimension.

Step 2) is to order the selection keys for each dimension according to the order of the component key fields in the Hypergrid.

Step 3) is to divide the query up according to the partitions defined in the first level of the composite key of the Hypergrid. This is done via the non-dense index corresponding to the first level in the composite key. If only some of the keys are selected from the corresponding dimension, then only the partitions associated with the selected keys are searched. If an exclusion list is used, only the partitions with exclusion keys are filtered for records that will not be included in the results of the query. In this case, all other partitions are included in their entirety. If neither selection nor exclusion are employed, all partitions are searched. The star-query method technique can efficiently be used here. With this technique, all possible composite key values specified by the query criteria are divided into the partitions to make the query search more efficient. Note also, that the complete list of composite search keys generated by the query criteria need not be generated to execute the search. The list can be treated as a virtual list and divided into the appropriate partitions and the query can correspondingly move through the query hierarchy.

Step 4) is to divide the query up according to the sub-partitions in the next level of the composite key in the Hypergrid. This is done according to the non-dense index associated with the next level key field in the Hypergrid. The partitions are searched according to the techniques in Step 3).

Step 5) is to repeat Step 3) and Step 4) until the search space is completely partitioned. At this point, only the necessary unit partition needs to be retrieved from secondary storage. Each of these unit partitions are searched according the query selection criteria and the boundaries of the unit partition. If a nested Hypergrid structure is used, repeat the Hypergrid search method for the data in each unit partition. All partitions can be searched in parallel with respect to both processors and secondary storage resources.

Step 6) is to merge and aggregate query results if necessary, and perform any remaining processing needed to present the query results. Full sorting should not be necessary to aggregate and reduce data.

Step 1)

Produce a set of selection keys from the user query. For each component key, this should include either a set of selected keys, a set of excluded keys, or a set of all keys.

Step 2)

Order the selection keys for each dimension by the same ascending/descending order as the corresponding key field in the Hypergrid.

Step 3)

Divide the query up according to the partitions of the first key in the composite key of the data.

Step 4)

Divide the query according to the sub-partitions of the next key field in the composite key.

Step 5)

Repeat Steps 3) and 4) until the query is completely partitioned.

Step 6)

As the subqueries from each partition are being concatenated together, merge and aggregate the data (if necessary).

Description—Alternative Embodiments

Hypergrid for Time Series Data

Virtually all OLAP data is time series data. That is, different data for the same composite key fields other than the time key field occur in different periods in time. For example, in March of 1995 fields A=2 and B=4 may not be represented in a fact table because the corresponding metric fields are 0 or null. In June of 1996, July of 1996, and December of 1996 A=2 and B=4 may be represented with a non-zero metric value. In fact in time series data, particular key values (excluding the time key) are likely to occur very often throughout all the time periods in the data.

In addition, once data is cleansed, validated, and placed in a fact table corresponding to a specific time period, it is often frozen and not changed or updated anymore. After the life cycle of the data is complete it is archived or removed from the fact table.

A simple modification to the Hypergrid allows it to support this scenario very well. The data is partitioned according to time periods. These time periods can be fixed, such as months, or the amount of data that is required to fill an I/O device or group of I/O devices to capacity. Once a partition or device is full, data with new or later time keys are moved to the next partition or device. A non-dense B-tree is maintained to stored boundary key values for the time partitions. As in the standard Hypergrid partitions, the time partition boundaries may need to make use of other fields to provide exact partition boundaries.

Within each partition, data is stored according to the standard Hypergrid data structure detailed above.

Hypergrid for Volatile Data

The standard Hypergrid may be inappropriate for large volatile fact tables. If fixed size fields are used, metric values can be updated without reorganizing the data. But, if variable length fields are used or if records are inserted or deleted, a Hypergrid associated with a fact table must be reorganized. This is a difficult process for very large fact tables (perhaps larger than 1 terabyte) that are updated frequently.

The Hypergrid can be modified to better accommodate this situation. Each I/O device can be treated like a data bucket or partition in a non-dense B-tree, B+-tree, or B# tree (like a B-tree but maintains a minimum of ⅔ full data buckets). Newly inserted or deleted data causes the data on each I/O device to be reorganized. This is a much easier task than reorganizing the entire Hypergrid for cases when the fact table is very large. If a partition contains too much or too little data after inserts or deletes, data is redistributed among the partition and its neighbors. Partition(s) are split or, partition(s) are merged. The disadvantage is that partitions are no longer completely full. According to test results on, B+-trees, and B# trees, the partitions average between 75 and 80% capacity.

As with the Time Series modification, within each partition, data is stored and organized according the standard Hypergrid method detailed above.

Operation—Alternative Embodiment
Hypergrid for Time Series Data

To build the Time Series Hypergrid, determine the size of the time partition and whether it is associated with an I/O device or a fixed time period such as a month or year. Once the time partition is determined, add data to the most current time partition as it is validated and cleansed. Optionally, when the oldest time partition becomes outdated, archive or remove it from the Hypergrid. Within each partition, organize and store the data with the standard Hypergrid method. Since the data is already partitioned by time, it is not necessary to use time as a member field in the individual time partitions. The boundary key values corresponding to each time partition are added to the Hypergrid B-tree indexes as the highest level B-tree index. As is the case with the standard Hypergrid method, if equal sized I/O devices are used as the time partitions, the other member fields of the composite field will be needed to determine precise key boundaries. This is not true if exact time partitions such as months or years are used. The time field is designated as the leading or most significant field.

To query the Time Series Hypergrid proceed exactly as with the standard Hypergrid.

Hypergrid for Volatile Data

To build the Volatile Data Hypergrid, treat each I/O device as a data bucket would be treated in a B-tree, B+-tree, or B# tree. Thus data can be sorted according to the composite key and massed loaded, or it can be batch loaded in an incremental fashion. To load the data incrementally, add data one record at a time until one of the I/O device partitions become full. When this happens, sort the data in the I/O device according to the boundary key order and split the data in the I/O device into two I/O devices, or three if B#-trees are used. Similarly when the number of records fall below minimum thresholds for the I/O device, merge the records in the device with an adjacent device according to key order. When all new data in the Volatile Data Hypergrid is updated, structure the data within each I/O device partition according to the standard Hypergrid method. As with the other forms of Hypergrids, all fields in the composite key of the fact table must be used to determine exact key boundaries. Finally, within each I/O device partition, the leading key of the I/O partition need not be used in partitioning the data since it has already been partitioned by this key.

Queries can be performed as they are in the standard Hypergrid method above.

Drawing Figures

OLAP (OnLine Analytical Processing) or multidimensional type data is stored in several dimensions or via a composite key. In an ideal situation where there is no sparsity in the data (no missing data in the multidimensional matrix formed by all possible combinations of the composite key values) the data can be stored in a multidimensional data structure such as depicted in FIG. 1. In this situation, all elements of the multidimensional matrix are stored in a flat file in a regular manner so that each element can be directly accessed with only one I/O or seek operation when queries are performed. In FIG. 1 a file containing 90 elements could be created representing the 6 months, 5 products, and 3 states shown in the figure. Unfortunately, however, most OLAP data is sparse by nature.

Consider an example of such data. Assume that the data is sparse so that there are missing values. Further assume that the data is sales data and that it could be stored by state, product, and month as shown below in FIG. 2A and FIG. 2B. FIG. 2C represents a minimum set of sorted copies of the data that would be required to efficiently query on all possible multidimension key combinations. In spite of the fact that this data is sparse and irregular, it needs only to be stored in a Hypergrid once. If such a table contains 100,000 records, dimensioned by the three dimensions above, and each disk block holds 100 records, the data could be partitioned such that the data is divided into 10 different ranges according to what state it represents, 10 different product ranges within the state partition, and 10 different time ranges within the combination of state/product ranges. The order of the partitioning is predetermined by the administrator of the data warehouse. The order in this case could be state, product, and time. The table is first sorted and partitioned according to state. Therefore the entire table is divided into 10 distinct state partitions. Then it is sorted and partitioned into 10 different product partitions within each state. Likewise, 10 distinct partitions of time can be created within each product partition. If a key does not change value exactly at the partition point, lower order columns in the composite key can be used to create a precise partition division point. After all these partitions are created, the 100,000 records are neatly divided into exactly 1000 pages with approximately 100 records on each block. Non-dense, B-tree indexes can be used to provide indexes into the partitions. One index involving all key columns in key order and with partition pointers can be used as the primary index. Then one index for each key column with fewer partitions can be used for each of the other key columns. Each higher level index would have fewer keys corresponding to fewer partitions. The internal structure would be similar to FIG. 3.

The partitions created by the Hypergrid are designed to improve the efficiency of I/O operations by concentrating closely related data items together. Data can be partitioned by the manner explained above across disk devices or other hardware devices as depicted in FIG. 4A, FIG. 4B, FIG. 4C, and FIG. 4E. Data on each hardware device can be further partitioned across all disks, disk pages, and/or disk cylinders within each hardware partition as depicted in FIG. 4A, FIG. 4C, FIG. 4D, and FIG. 4E. FIG. 4E represents a RAID I/O storage device where several disks simulate one virtual disk. In this case, the device is treated as one virtual disk. In addition, the partitioning along with proper partitioning of nested star-joins clusters needed I/Os together very efficiently by grouping I/O requests together and by accessing only the partitions that are needed as indicated by the partitions with hatching in FIG. 4C and FIG. 4D. Finally, the non-dense indexing that is used by the partitioning works very well with I/O caching such as is found in many high performance I/O subsystems. Non-dense indexes are also usually small enough to be completely contained in RAM memory. cl Summary, Ramifications, and Scope This invention truly has the ability to revolutionize the data warehouse and OLAP industry. It is simple to implement and maintain yet provides very powerful features designed just for this type of data.

It uses much less computer storage space. Since OLAP and data warehouse applications are well known to use copious amounts of computer storage space, this is a great advantage. It can pack file pages or unit partitions near 100% full and does not require any additional index space. Due to the ability of this invention to pack file pages or unit partitions to nearly 100% capacity, the structure can be nested so that one hypergrid contains unit partitions which contain another hypergrid. This further aides query speed once data is moved into computer memory.

It can take advantage of very fine grained parallelism at the storage device level and can take advantage of full multidimensional partition selectivity simultaneously. This "divides and conquers" data search space to a maximum degree.

It can create a perfect n-dimension hypercube no matter how sparse the data or how many multidimensional keys there are in the data.

It provides maximum data locality. All records that are being queried are extracted from a file page or unit partition at one time. No file page or unit partition is ever retrieved more than once during the life of a query. If all keys in the multidimension composite key are specified, exactly one I/O operation is required to retrieve the record.

Nested star loops associated with OLAP type queries can be perfectly unfolded to match the exact structure of data stored by the method presented in this invention.

It is very flexible. Weights or other constraints can be added to adjust the degree of symmetric multidimensional access of individual keys within a multidimension composite key.

As explained in the alternative embodiments section above, it provides good bulk load and update performance for even very volatile data. As further explained, it provides especially good bulk load and update performance for true time-series data.

The description above contains many specificities. But, these should not be used to limit the scope of this invention. Instead, they provide illustrations of some of the possible embodiments of the invention. The invention can be used in a variety of other ways. It can be used with variable length keys, other build and query techniques, text keys, in combination with other data structures, etc.

As a result the scope of this invention should be determined by the appended claims and their legal equivalents, in lieu of the descriptions and specifications above.

I claim:

1. A method of partitioning data regardless of the sparsity of said data on to computer memory or computer storage media with one or more keys or groups of keys from said data such that the selectivity produced by any combination of said keys or said groups of one or more keys can be precisely controlled comprising the steps of:
   a) determining the number of records from said data to be packed into each unit partition
   b) determining selectivity of each said key or said group of one or more keys chosen from said composite key so that the combined selectivity of all said keys or said groups of one or more keys is equal to the total number of unit partitions in said data
   c) arbitrarily choosing a first component key or group of one or more component keys from said chosen component keys in said composite key
   d) partitioning said data by said first key or group of one or more keys of said chosen component keys possibly followed by one or more of the other component keys in said composite key
   e) creating a non-dense index formed from said first key or group of one or more keys and possibly followed by one or more of the other component keys in said composite key aligned with the boundaries of said partitions created in step d)
   f) choosing a new first key or group of one or more keys from said chosen component keys in said composite key
   g) repeating steps d), e), and f) within each said partition created from the previous iteration of step d) as many times as required to produce said total number of unit partitions contained within said data thereby producing an organization of said data whose said selectivity of combinations of said keys can be precisely controlled by said selectivity for each said key or group of one or more said keys as determined in step b).

2. A method of partitioning data regardless of the sparsity of said data on to computer memory or computer storage media with one or more keys or groups of keys from said data such that the selectivity of any combination of involved said keys or said groups of one or more keys is symmetric yet the degree of packing of records from said data into unit partitions can be precisely controlled comprising the steps of:
   a) determining the number of records from said data to be packed into each unit partition
   b) determining selectivity of each said key or said group of one or more keys chosen from said composite key so that the combined selectivity of all said keys or said groups of one or more keys is equal to the total number of unit partitions in said data
   c) arbitrarily choosing a first component key or group of one or more component keys from said chosen component keys in said composite key
   d) partitioning said data by said first key or group of one or more keys of said chosen component keys possibly followed by one or more of the other component keys in said composite key
   e) creating a non-dense index formed from said first key or group of one or more keys and possibly followed by one or more of the other component keys in said composite key aligned with the boundaries of said partitions created in step d)
   f) choosing a new first key or group of one or more keys from said chosen component keys in said composite key
   g) repeating steps d), e), and f) within each said partition created from the previous iteration of step d) as many times as required to produce said total number of unit partitions contained within said data thereby producing an organization of said data whose said selectivity for any combination of said keys or said groups of one or more keys can be made to be symmetric by step b) and whose packing of said records into said unit partitions can be precisely controlled by step a).

3. The method of claim 2, wherein all said unit partitions, file pages, or I/O sectors are fully packed to hold the maximum number of said records per unit partition.

4. The method of claim 3, wherein said records within each said unit partition are further subpartitioned by the method of claim 3 in a nested fashion such that additional said computer memory or said computer storage media are not required.

5. The method of claim 4 combined with other data structures or partitioning methods such that said data can be partitioned across hardware devices or entire computers with conventional methods and subpartitioned by the method of claim 3 in a nested fashion such that additional said computer memory or said computer storage are not required.

6. A method of partitioning data regardless of the sparsity of said data on to computer memory or computer storage media with one or more keys or groups of keys from said data such that the selectivity of any combination of involved said keys or said groups of one or more keys is symmetric yet a non-dense index which requires no addition computer memory or computer storage media space can be built comprising the steps of:

a) determining the number of records from said data to be packed into each unit partition taking into account the extra available space in said unit partitions due to the removal of one or more said component records from one said record in said unit partitions b) determining selectivity of each said key or said group of one or more records chosen from said composite key so that the combined selectivity of all said keys or said groups of one or more keys is equal to the total number of unit partitions in said data c) arbitrarily choosing a first component key or group of one or more component keys from said chosen component keys in said composite key d) partitioning said data by said first key or group of one or more keys of said chosen component keys possibly followed by one or more of the other component keys in said composite key e) creating a non-dense index formed from said first key or group of one or more keys and possibly followed by one or more of the other component keys in said composite key aligned with the boundaries of said partitions created in step d) and removing one or more said component keys from one said record out of each said unit partition corresponding to each entry in said non-dense index f) choosing a new first key or group of one or more keys from said chosen component keys in said composite key g) repeating steps d), e), and f) within each said partition created from the previous iteration of step d) as many times as required to produce said total number of unit partitions contained within said data thereby producing an organization of said data whose said selectivity for any combination of said keys or said groups of one or more keys can be made to be symmetric by st b) and on which a corresponding non-dense index requiring no additional computer memory or computer storage media space can be built.

\* \* \* \* \*